(12) United States Patent
Stuart et al.

(10) Patent No.: US 11,757,989 B2
(45) Date of Patent: Sep. 12, 2023

(54) SYSTEM AND METHOD FOR INCORPORATING SENSOR MEASUREMENTS INTO A BLOCKCHAIN

(71) Applicant: Carbon-Block Inc., Winnipeg (CA)

(72) Inventors: Alex Stuart, Winnipeg (CA); Justin Phillips, Winnipeg (CA)

(73) Assignee: Carbon-Block Inc., Winnipeg (CA)

( * ) Notice: Subject to any disclaimer, the term of this patent is extended or adjusted under 35 U.S.C. 154(b) by 645 days.

(21) Appl. No.: 16/560,460

(22) Filed: Sep. 4, 2019

(65) Prior Publication Data

US 2020/0076891 A1 Mar. 5, 2020

Related U.S. Application Data

(60) Provisional application No. 62/726,859, filed on Sep. 4, 2018.

(51) Int. Cl.
| | |
|---|---|
| *H04L 29/08* | (2006.01) |
| *H04L 67/1061* | (2022.01) |
| *H04W 4/80* | (2018.01) |
| *H04L 9/06* | (2006.01) |
| *H04L 67/12* | (2022.01) |
| *H04L 9/00* | (2022.01) |

(52) U.S. Cl.
CPC ........ *H04L 67/1065* (2013.01); *H04L 9/0643* (2013.01); *H04L 67/12* (2013.01); *H04W 4/80* (2018.02); *H04L 9/50* (2022.05); *Y02P 90/845* (2015.11)

(58) Field of Classification Search
CPC ... H04L 67/1065; H04L 9/0643; H04L 67/12; H04L 2209/38; H04L 9/0872; H04L 9/3239; H04L 63/12; H04L 2209/805; H04W 4/80; H04W 4/38; Y02P 90/845
See application file for complete search history.

(56) References Cited

U.S. PATENT DOCUMENTS

2018/0313798 A1* 11/2018 Chokshi ................ G01D 9/005
2019/0311443 A1* 10/2019 Blades ................... G01D 4/002

* cited by examiner

*Primary Examiner* — Kim T Nguyen
(74) *Attorney, Agent, or Firm* — GORDON & JACOBSON, P.C.

(57) ABSTRACT

A tracking system and method for incorporating sensor measurements into a blockchain are provided. The system comprises at least one meter for measuring GHG emissions and generating measurements related to the emissions, at least one server communicating with the at least on meter over a peer-to-peer network. The peer-to-peer network is implemented as a distributed ledger of the blockchain. The at least one meter transforms the measurements into at least one carbon block and writes the at least one carbon block to the distributed ledger. The at least one carbon block is distributed to the at least one server via a blockchain protocol.

21 Claims, 4 Drawing Sheets

SYSTEM AND METHOD FOR INCORPORATING SENSOR MEASUREMENTS INTO A BLOCKCHAIN

FIELD

This invention is in the field of blockchains, and more specifically to a blockchain meter or oracle to verify real-world occurrences. Even more specifically, for blockchain oracles to track greenhouse gas emissions and sinks. The invention also relates to incorporation of sensor measurements into a blockchain. More particularly, the invention relates to incorporating global positioning sensor measurements into a blockchain. Even more particularly, the invention relates to a blockchain of things (BoT).

BACKGROUND

Rising greenhouse gas (GHG) emissions, such as carbon dioxide (CO2), are recognized as an issue for humanity and several global treaties have been negotiated to address these emissions. While the efficacy of these treaties is mixed, the world is moving towards an economic model that includes a price of on greenhouse gas production. Current models are cumbersome, expensive, and rely heavily on trust in auditors. There exist similar problems with tracking, verifying, and/or auditing in other industries.

The economic growth of the past two hundred years has been driven, in part, by the combustion of fuel, which results in the production of carbon dioxide. There is recognition that $CO_2$ is a major GHG that may impact climate change when emitted over the environment's ability to absorb it. While there are natural sources of CO2 emissions, there has been considerable emissions generated from human activity. The combustion of carbon-based fuels is a source of these emissions. Modern economies produce CO2 through a combustion of natural gas (heat and energy), gasoline (transportation), and coal (energy).

Government bodies throughout the world have attempted have negotiated several treaties, such as the Paris Agreement and the Kyoto Protocol. The Paris Agreement's aim is to attempt to keep a global temperature rise this century below 2° C. above pre-industrial levels and to pursue efforts to limit the temperature increase to 1.5° C. The Agreement proposes a global assessment of the collective progress towards achieving the purpose of the Agreement. The Paris Agreement requires all Parties to put forward their best efforts through "nationally determined contributions" (NDCs). This includes requirements that all Parties report regularly on their emissions and on their implementation efforts.

For the Kyoto protocol, countries have targets for limiting or reducing emissions. These targets are expressed as levels of allowed emissions, or "assigned amounts," over the 2008-2012 commitment period. The allowed emissions are divided into "assigned amount units" (AAUs). Emissions trading, as set out in Article 17 of the Kyoto Protocol, allows countries that have unused emission units to sell this excess capacity to countries that are over their targets. Thus, a new commodity was created in the form of emission reductions or removals. Transfers and acquisitions of these units are tracked and recorded through the registry systems under the Kyoto Protocol. An international transaction log ensures secure transfer of emission reduction units between countries. As a result, many countries have adopted a measurement and tracking of GHG emissions.

A carbon credit is generally a representation of an activity that decreases greenhouse gas emissions by one tonne of carbon and can be in the form of offsets or reductions in carbon emissions. The credit represents a tangible asset and may be valued and traded within a market system. Most carbon credits in use come from an auditing process conducted by an accounting firm. Most large accounting firms have emission verification/auditing departments. The purpose of a third party carbon credit verifications is to ensure organizations are accurately reporting carbon reductions or carbon emissions (e.g. debt) in order to prevent fraud. The current auditing process is very involved for a credit producer and consumer devoting considerable time and financial resources to ensure a certified audit.

Generally, there are two models to effect behavioural change: a carbon tax and cap-and-trade. The more GHG emissions generated, the higher the economic penalty. In the carbon tax model, a regulator sets a price for a ton of GHG emissions measured in $CO_2$-equivalence (CO2e) and then determine how much a source is emitting GHGs. The emitter is then taxed accordingly.

The cap-and-trade model allows for a market of buyers and sellers to discover an equilibrium price for CO2e. A maximum cap may be imposed on emitters (or individuals) by the regulator and over time this cap is reduced. When the emitter exceeds the maximum cap, the emitter must purchase carbon credits/offsets from another source or sell carbon debt to others. This model allows governments to set quotas and trading regimes that best suit particular economies.

SUMMARY

The aspects as described herein in any and all combinations. The aspects described herein may be directed particularly to GHG tracking but may apply equally to other fields.

In one aspect, a GHG tracking system is provided comprising at least one meter for measuring GHG emissions from at least one emitter, and generating measurements related to the emissions; at least one server communicating with the at least on meter over a peer-to-peer network, the peer-to-peer network being implemented as a distributed ledger of a blockchain. The at least one meter transforms the measurements into at least one carbon block and writes the at least one carbon block to the distributed ledger; and at least one carbon block is distributed to the at least one server via a protocol.

According to another aspect, each of the at least one meter of the GHG tracking system comprises at least one sensor for measuring the GHG emissions; a memory for storing the measurements from the at least one sensor; a meter processor in communication with the at least one sensor for transforming the measurements into the at least one carbon block; and a meter transceiver for writing the carbon block to the distributed ledger.

In another aspect, each of the at least one meter of the GHG tracking system comprises a sensor for measuring a fuel amount corresponding to the GHG emissions from its associated emitter, a global positioning sensor (GPS) for measuring a location of the associated emitter and a clock set to a time zone determined by the GPS.

According to another aspect, a GHG emission tracking method is provided, comprising: measuring GHG emissions related to at least one emitter; generating measurements related to the emissions; transforming the measurements into at least one carbon block; writing the carbon block into a distributed ledge of a blockchain; and distributing the carbon block into at least one server via a protocol.

According to a further aspect, the GHG emission tracking method comprises measuring a fuel amount from the at least one emitter; measuring a location of the at least one emitter; and measuring a time related to the location.

According to another aspect, the GHG emission tracking method, further comprises bundling the measurement of the fuel amount, the location and the time before transforming into the carbon block.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Although auditing firms may be effective at verifying carbon credits, the auditing firm is reliant on a carbon credit producer to provide accurate information on the carbon credit generation. For example, the current model for creating a carbon credit requires a great deal of effort by the auditor or accounting firm that must put their name behind the carbon credit actually existing. Auditors work with an emitter or the carbon credit producer to validate a Carbon Dioxide equivalent (CO2e) emission or a carbon credit. This process may take considerable time and resources resulting in a higher administrative cost for businesses to measure, track, and audit CO2e emissions.

As the carbon pricing markets expand, a value of these carbon credits may increase, and market participants may have a motivation to commit fraud. There also may not be adequate enforcement should the carbon credit producer commit carbon credit fraud. Conflicts of interest may also occur as there are currently a limited number of carbon auditors. The emitter and/or carbon credit producer may not be able to avoid working with an accounting or audit firm that represents themselves, their customers, competition, or their vendors.

In general a carbon credit verification process generally involves determining an initial CO2e emission for an entity (or individual), performing a CO2e emission reduction activity (e.g. technology upgrades, soil management activities, etc.), calculating or measuring to determine a reduction in CO2e emissions, and an auditor issuing an auditor's report that reports the carbon credits or debt.

Figure 1:
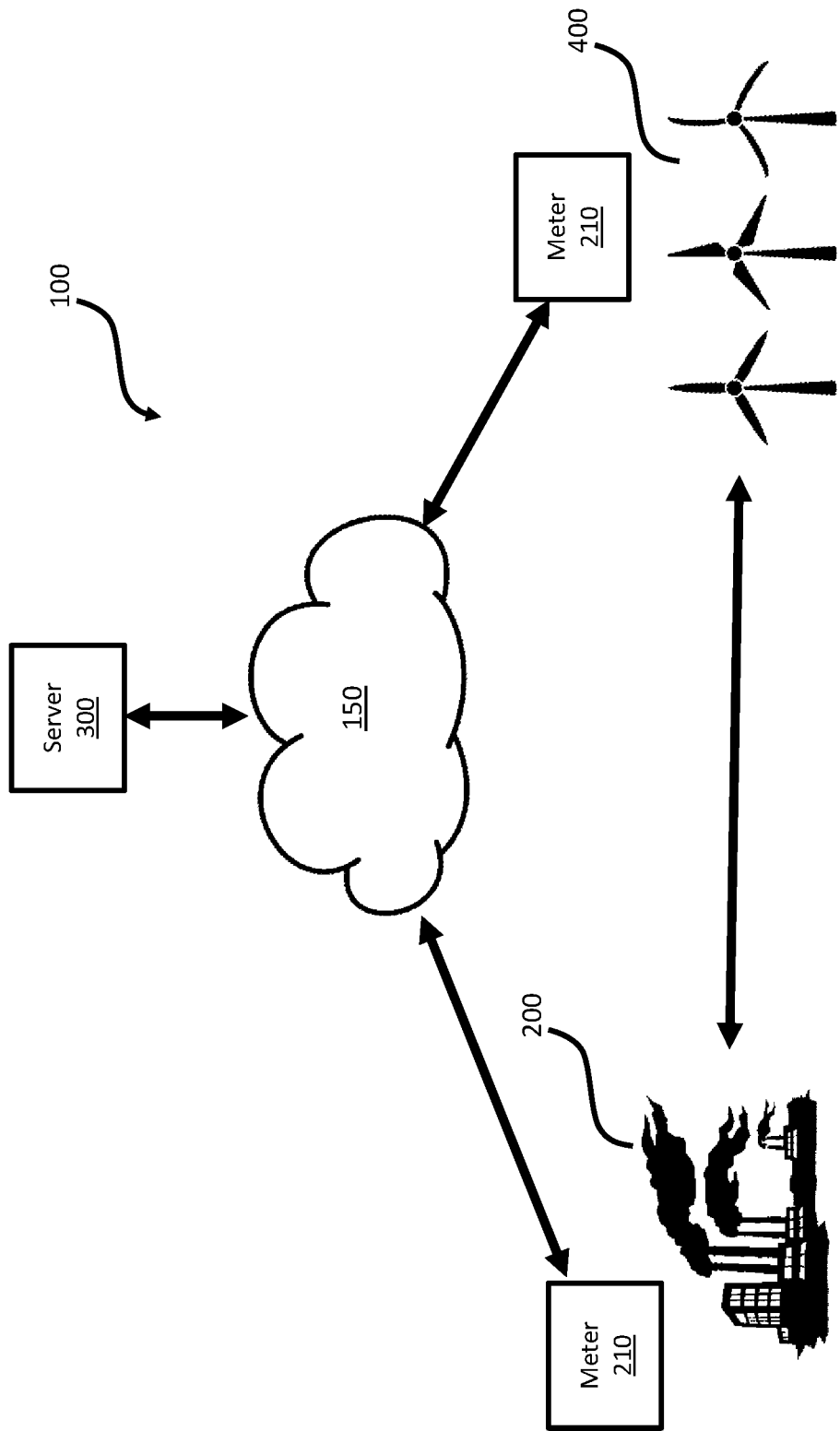
FIG. 1 is a conceptual overview of components of a greenhouse gas tracking system.

With regard to FIG. 1, a GHG tracking system 100 is provided having one or more GHG emitters 200, meters or oracles 210, carbon credit producers 400, and servers 300 communicating over a peer-to-peer network 150 that may be implemented as a distributed ledger. In some aspects, the GHG emitters 200 may communicate directly with the carbon credit producers 400. The peer-to-peer network 150 may communicate over the Internet, WiFi, cellular network, and/or satellite and may use a blockchain protocol. The GHG tracking system 100 may have one or more GHG emitters 200, such as industrial facilities, power generators, homes, vehicles, etc.

Figure 2:
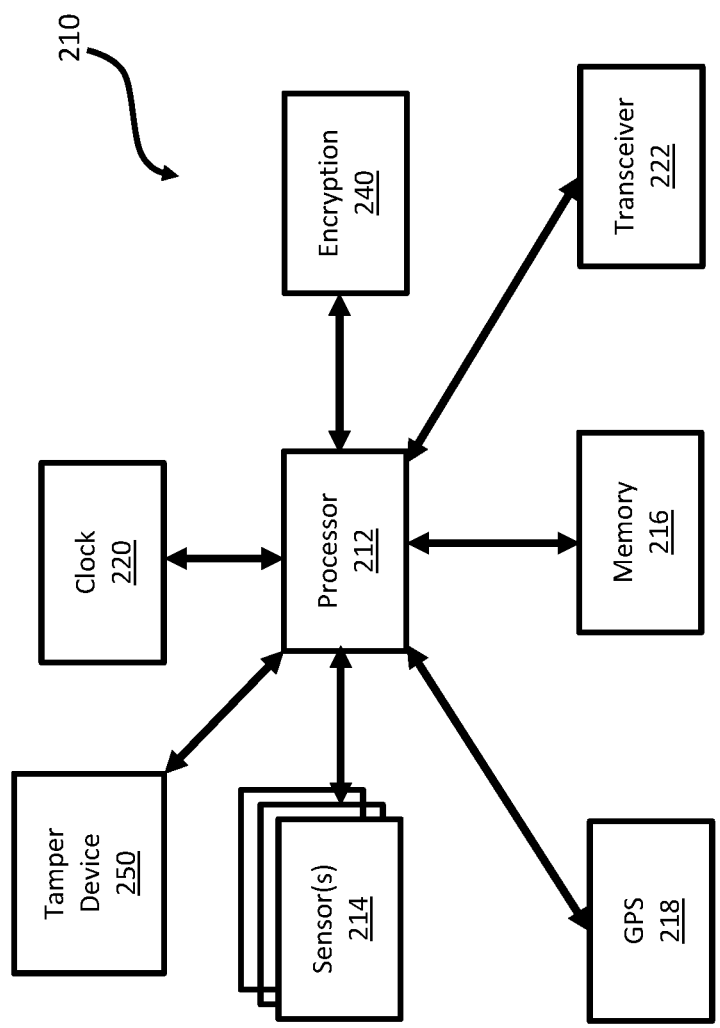
FIG. 2 is a block diagram of a greenhouse gas meter.

For each of the GHG emitters 200, a GHG meter or oracle 210, shown in more detail in FIG. 2, may be configured to measure a fuel amount corresponding to the GHG emissions from its associated the emitter 200. For example, the meter 210 may measure a flow of natural gas from a main line (not shown) to a furnace (not shown). In another example, the meter 210 may measure the amount of electricity generated and supplied to an electrical grid (not shown). The meter 210 comprises a meter processor 212 in communication with one or more sensors 214. As the emitter 200 generates GHGs, the sensors 214 measure the fuel amount and transfers one or more fuel measurements to the processor 212, which in turn stores the fuel amounts into a tangible computer-readable memory 216. The meter or oracle 210 may comprise a transceiver 222 for writing blocks to the distributed ledger 150 using a blockchain protocol that may be distributed to the one or more servers 300 and/or other oracles 210. In some aspects, the meter or oracle 210 may also communicate using an https protocol and/or TCP/IP.

The meter 210 may comprise a global positioning sensor (GPS) 218 for receiving a global position of the meter 210. The processor 212 may read the GPS 218 periodically in order to ensure that the meter 210 has not changed position. In another aspect, such as at a fixed industrial facility, the processor 212 may read the GPS 218 during installation of the meter 210 at the emitter 200. In another aspects, such as when the meter 210 is installed into a vehicle (not shown), the GPS 218 may be read during travel of the vehicle and the GPS coordinates may be stored generally simultaneously with the fuel measurements. According to another aspect, the GPS 218 may be permitted to roam within an area, such as when the meter 210 is moved around a facility to record measurements. The GPS coordinates may be stored into the memory 216.

The meter 210 may comprise a clock 220 that may be set to Universal Time Coordinated (UTC) time or may be set to a time zone determined by the GPS 218. In another aspect, the clock 220 may be set using a signal of the GPS 218. The clock 220 may be external to the processor 212 or may be internal to the processor 212. When the fuel measurements are stored into memory 216, the processor 212 may also record the time from the clock 220.

Periodically, the processor 212 may bundle the one or more fuel measurements, GPS coordinates, and/or time into one or more data packets that may be transformed into a carbon block. The carbon block may be written to the distributed ledger 150 and distributed to the one or more servers 300 using the blockchain protocol and distributed to a fellow miner or node. In this manner, the processor 212 may act as a miner whereby the processor 212 may execute proof of work calculations, proof-of-location (e.g. GPS), proof-of-identity (e.g. serial number), proof of time, all of which can be either written to the genesis block (and in some aspects, any subsequent blocks) or written to any other aspect of the blockchain as described in further detail below. The processor 212 may write the carbon blocks to the distributed ledger 150 when the memory 216 has become full or at any other periodic time, such as when a reconciliation is required. In other aspects, the processor 212 may write the carbon blocks to the distributed ledger 150 after each fuel measurement. In aspects where the meter 210 is located on a vehicle, the meter 210 may transmit the carbon blocks once the vehicle has reached a base station (not shown) or has connected with the servers 300.

In another aspect, the processor 212 may transmit the measurement data to the server 300 where the server processor 312 may act as the miner. The server processor 312 may perform the proof of work to write to the blockchain. In some aspects, the processor 312 may write to an internal blockchain for future use and/or reference.

In another aspect, the meter 210 may comprise additional sensors that may be read by the processor 212. Sensor data from the sensors may be included in a genesis block (e.g. starting block) and/or added to any of the other carbon blocks written to the distributed ledger 150. The meter 210 may function as an encoding device between an Internet of Things (IoT) or between a blockchain of things (BoT) comprising the blockchain protocol.

The meter 210 may provide security through the use of the distributed ledger 150 as the sensor data may be sent directly to one or more of a peer of each meter 210. For example, the meter 210 may periodically send a ping or a peer request to the distributed ledger 150 in search of peers. The closest peers (e.g. closest hop count, fastest ping response time, or combination thereof) may respond to the initial ping or the peer request and may then be set to be the peers for the meter 210 in the peer-to-peer distributed ledger 150 via the blockchain protocol.

In some aspects, the meter 210 may comprise an encryption module 240 that may encrypt and decrypt a plurality of instructions for execution by the processor 212 to prevent tampering with the instructions to be executed by the processor 212. The encryption module 240 may encrypt and decrypt any communications between the processor 212, the peers for the meter 210, and/or the one or more servers 300. The processor 212 may be configured to only communicate with the peers of the meter 210 in order to prevent tampering the measurements transmitted by the meter 210.

The meter 210 may comprise a tamper detection device 250 that detects tampering. If the tamper detection device 250 detects an incident of tampering, such as opening the meter, the tamper detection device 250 signals the processor 212. The processor 212 then may disable the meter 210. In another aspect, the processor 212 may transmit tampering data containing an identification or signature of the meter 210, a GPS coordinate, and/or the time of tampering to the distributed ledger 150. The tampering data may be recorded as a last link in the blockchain and may communicate this last link with the distributed ledger 150 via the one or more peers prior to de-authorizing itself from writing to the blockchain. According to some aspects, the sensor data and/or the instructions executing on the meter 210 may be erased in the event of tampering following the write of the tampering data to the blockchain.

According to some aspects, the tamper detection device 250 may comprise a data port for receiving one or more peripherals (not shown) and/or for communicating with other devices outside of the blockchain protocol. For example, the data port may communicate with the IoT devices, sensor(s) 214, and/or a web server. Each data port may comprise a level of trust associated with the device connected to the data port. For example, a physical (non-internet connected) thermostat may comprise a higher level of trust than an IoT thermostat since the IoT thermostat may be corruptible. In another example, temperature data from an unsecured website (e.g. theweathernetwork.com) may have a lower level of trust as the temperature data may have been tampered with during transmission.

When the peripheral, sensor, or other device is connected to the data port, starting data containing one or more starting parameters of each of the connected peripherals may be transmitted to the meter 210 and incorporated into a nonce. When the peripheral, sensor, or other device is connected to the data port at a later time, the meter 210 may write an initialization of the peripheral, sensor, or device to the distributed ledger 150. When one of the peripherals, sensors, or other device is disconnected, a trigger may be transmitted to the meter 210 for incorporation into the blockchain indicating that the device may have been tampered with.

According to another aspect, the peripheral may incorporate an RFID tag that may be brought into contact with a reader (not shown) in the meter 210. When the reader receives a signal from the RFID tag via the data port, the processor 212 may generate a message based on the signal from the RFID tag to be incorporated into the blockchain according to the blockchain protocol. For example, if a shipping container with a RFID tag comes into a port, the meter 210 may register the RFID and cause an arrival message to be incorporated into the blockchain by the meter 210.

Figure 3:
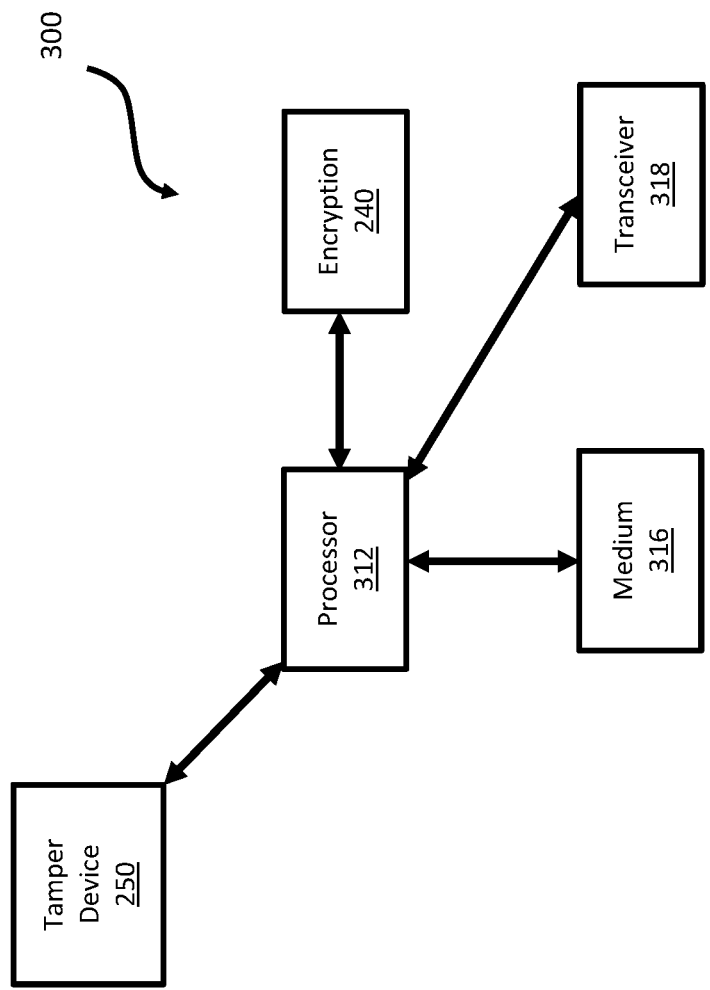
FIG. 3 is a block diagram of a server for the greenhouse gas tracking system.
Figure 4:
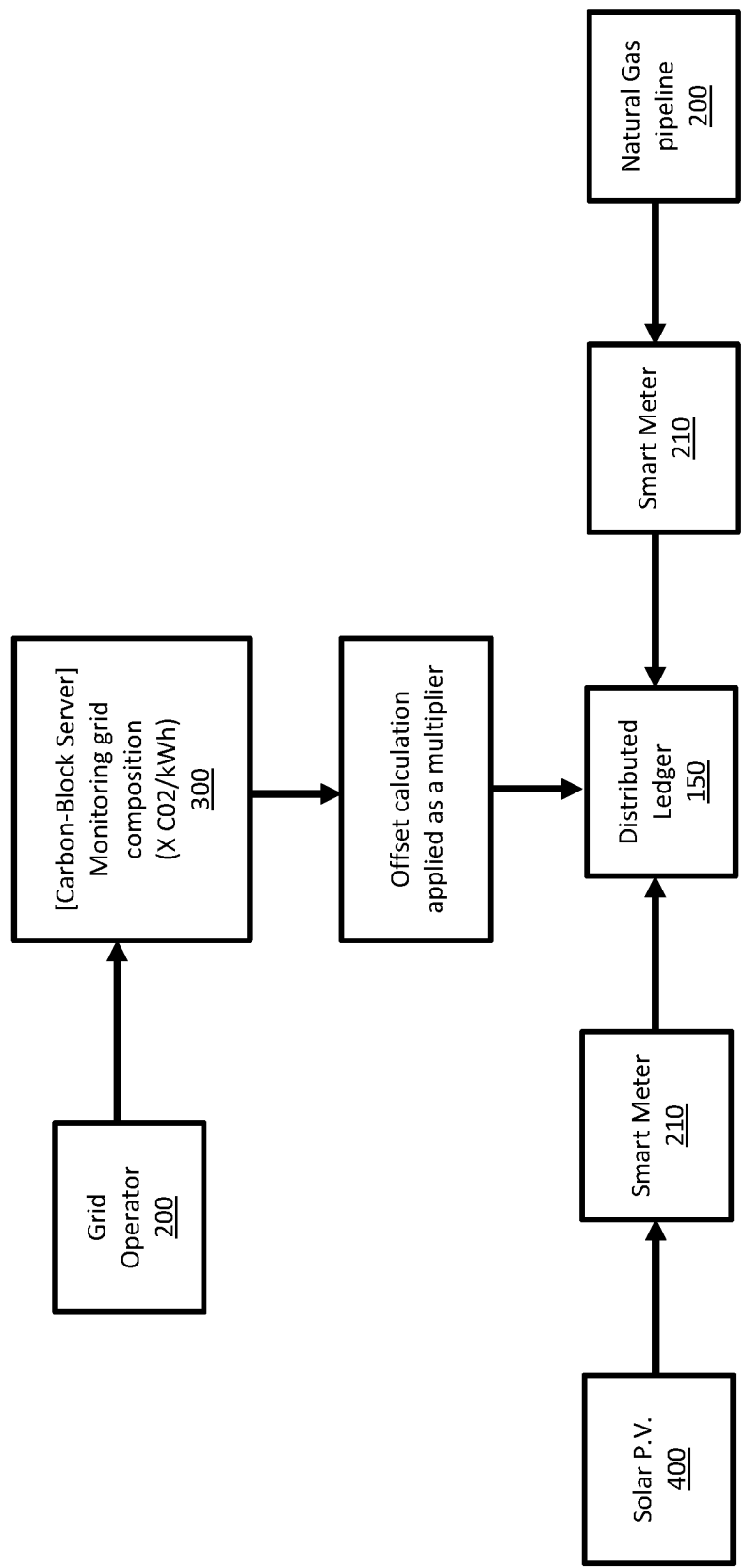
FIG. 4 is a block diagram of the overall process for the greenhouse gas tracking system.

Turning now to FIG. 3, a server 300 is shown comprising a server processor 312, a tangible computer-readable medium 316, and a transceiver 318 for communicating with the network 150. The server 300 may also comprise the tamper detection device 250 and/or the encryption module 240 as previously described. The medium 316 may comprise one or more instructions to configure the server processor 312 to receive at least a portion of the blockchain. The server processor 312 may be configured to only receive communications from the one or more registered meters 210 recorded on the blockchain. If the server processor 312 receives any other packets from other meters 210 not on the blockchain, the server processor 312 may discard the packets.

During registration, the emitter 200, trader (not shown), and/or carbon credit producer 400 may provide one or more public keys associated with a private key (e.g. ownership key) associated with one or more wallets to the distributed ledger 150. Along with the public key(s), the registration may comprise a serial number of the meter 210 being registered. During a transaction, the meter 210 may sign the carbon block with the private key and include the public key of the emitter 200, and write the carbon block to the distributed ledger 150. The emitter 200 and/or the carbon credit producer 400 may match the private key with the public key in order to increase and/or decrease the balance of the wallet(s). Once the private key matches the public key on the distributed ledger 150, the transaction may be complete and distributed ledger 150 records the updated account information.

In some aspects, the server processor 312 may store the public keys of each emitter 200 and/or each carbon credit producer 400 in the medium 316. In other aspects, the meters 210 may store the public keys of each emitter 200 and/or each carbon credit producer 400 in the memory 216.

According to some aspects, the distributed ledger 150 may be stored on all participating nodes (e.g. any node registered in the blockchain). In other aspects, a portion of the distributed ledger 150 may be cached on the participating nodes and if the node (or meter 210) requires portions not cached, the meter 210 may request the missing portion from other peer nodes. The distributed ledger 150 may be accessed by the server 300 that may not necessarily store the entire distributed ledger 150. A trading platform (not shown) may reference the distributed ledger 150 in the event of a trade transaction. If the trade transaction is found to be valid, the trading platform may execute a smart contract for an automatic exchange of the private and the public keys between blockchain holders. The distributed ledger 150 may automatically update since the blockchain of the two participants to the transaction would be updated resulting in a ripple effect throughout the distributed ledger 150.

In some aspects where the meter 210 may be incapable of writing directly to the blockchain, the server processor 312 may receive packets from one or more of the meters 210 and the server processor 312 may determines which wallet corresponds to each of the meters 210. The processor 312 may then execute instructions in order to create a carbon block to be assigned to the corresponding wallet and to be added to the blockchain. The processor 312 may use the fuel measurements in order to define a proof-of-work in order to generate the carbon block.

The fuel measurement data may be converted to CO2e using an energy to CO2e conversion ratio provided by the regulator. For example, the ratio for a cubic meter of natural gas may be 0.512 kg of CO2e. There may be a plurality of energy to CO2e conversion ratios corresponding to a type of fuel being consumed or a type of GHGs being emitted (e.g. methane, natural gas, gasoline, diesel, and/or heavy oil). The meter 210 and/or server 300 may be preprogrammed to determine the fuel type based on the data input to the data port. The regulator may establish the ratio(s) between a unit of fuel consumed to the unit of CO2e emitted. The server processor 312 may receive this ratio over the distributed ledger 150 after the regulator has written the ratio to the blockchain to ensure timely updates of the appropriate ratio. In other aspects, the ratio(s) may be embedded within the medium 316 of the server 300 and may not be alterable.

Once the fuel measurement data has been converted to CO2e emissions, the processor 312 may generate the carbon block. The carbon block comprises the CO2e emissions, GPS coordinates, and/or time. The GPS coordinates may provide a proof-of-location to be used in the block creation process and may also be available in the blockchain.

In another aspect where the meter 210 is capable of writing directly to the blockchain, the processor 212 may receive sensor measurements from the data port and may execute instructions in order to create the carbon block to be assigned to the corresponding wallet and to be added to the blockchain. The processor 212 may use the fuel measurements in order to define a proof-of-work in order to generate the carbon block.

The fuel measurement data may be converted to CO2e using an energy to CO2e conversion ratio provided by the regulator. For example, the ratio for a cubic meter of natural gas may be 0.512 kg of CO2e. There may be a plurality of energy to CO2e conversion ratios corresponding to a type of fuel being consumed or a type of GHGs being emitted (e.g. methane, natural gas, gasoline, diesel, and/or heavy oil). The processor 212 may be preprogrammed to determine the fuel type based on the data input to the data port. The regulator may establish the ratio(s) between a unit of fuel consumed to the unit of CO2e emitted. The processor 212 may receive this ratio over the distributed ledger 150 after the regulator has written the ratio to the blockchain to ensure timely updates of the appropriate ratio. In other aspects, the ratio(s) may be embedded within the memory 216 of the meter 210 and may not be alterable.

Once the fuel measurement data has been converted to CO2e emissions, the processor 212 may generate the carbon block. The carbon block comprises the CO2e emissions, GPS coordinates, and/or time. The GPS coordinates may provide a proof-of-location to be used in the block creation process and may also be available in the blockchain.

The time may be used to provide a proof-of-time for the carbon block and may also be available in the blockchain. The proof-of-time may be applicable to electrical grids having a mix of energy sources (e.g. emitters) that may complicate the determination of the appropriate CO2e conversion ratio. For example, some electrical grids may have energy sources associated with higher carbon emissions, such as coal or natural gas, used in conjunction with energy sources associated with lower carbon emissions, such as nuclear or hydroelectric power. The mix of energy sources fluctuates throughout time in response to a grid demand and a response time of the energy source. Since the mix of energy sources into the electrical grid fluctuates, this fluctuation increases the difficulty in determining the appropriate CO2e conversion ratio.

The meter processor 212 and/or the server processor 312 may correlate the proof-of-time for a particular meter 210 to the electricity provider's mix of energy sources in order to determine the CO2e conversion ratio. For example, a grid operator may run natural gas plants during the hours of 10 am and 2 pm to accommodate regularly occurring spike in electricity demands. The increased input of natural gas may cause the energy associated with that time to have a higher carbon emission. Therefore, the meter processor 212 and/or the server processor 312 may assign a higher CO2e conversion ratio when converting the fuel measurement data for that time period. At the same time, a small solar array is operating on that grid during that time may receive a greater carbon credit for inputting non-emitting energy onto the grid.

Any of the relevant data may be recorded in the nonce (e.g. starting block). A nonce may be generated from at least one of: the identifier or signature of the meter 210, the GPS coordinates, and/or the time. In particular for the meter 210, the nonce may comprise at least one of a serial number of the meter 210, one or more serial numbers of any peripherals attached to the meter 210 at a time of booting, initialization data from any of the peripherals (e.g. GPS, time, temperature, etc.) and/or a random number generated by the meter 210 during booting. The random number may comprise a 32-bit arbitrary random number that is typically used once. The nonce may not be replicated by any other peer on the distributed ledger 150.

According to some aspects, when the meter 210 boots, the meter 210 may also ping the distributed ledger for peers and the distributed ledger may return with a number of the closest peers (e.g. geographically, regionally, network hops, ping time, or any combination thereof). The number of the closest peers may be determined by the blockchain protocol. The meter 210 may then log the closest peers either as part of the nonce or as part of a first transaction of the blockchain by this particular meter 210. The connections may be written to the distributed ledger 150. The meter 210 may only be permitted to communicate with the closest peers in order to validate the integrity of the peers. When the integrity of one of the closest peers is compromised, any corruptions in the blockchain may be identified and may permit the distributed ledger 150 to be corrected.

Typically for proof-of-work models, each of the participants race to hash (e.g. compute) the nonce. The participant that wins the race is awarded the block. The generation of the nonce by the meter 210 itself may significantly reduce computing power required as part of the proof-of-work framework. Rather than the meter 210 providing proof-of-work, the meter 210 provides a proof-of-identity through the use of the serial number, time, and/or GPS coordinates.

The carbon block may be created using a Secure Hash Algorithm (SHA). For example, the use of a SHA-3 or more specifically SHA-512/256 as is known in the art. Once the carbon block is created the server processor 312 updates a ledger and assigns the carbon block to the corresponding wallet.

The distributed ledger 150 may comprise a permissioned ledger type where participants (e.g. emitters, producers, and/or regulators) may access relevant data without having to participate in the entire blockchain. The permissioned ledger 150 may permit only certain computers to download and/or access the ledger. While the ledger 150 may have unauthorized copies, the renegade copies will not have access to the market, or receive updates to the ledger 150. The permissioned ledger 150 may overcome a potential weakness in the proof-of-work models for GHG emissions and reductions. For example, in the proof-of-work model, as time passes and the blockchain grows, the blockchain requires larger computing resources and storage. The permissioned ledger 150 may also permits the regulator to establish qualified market participants rather than in a public ledger where the data on the blockchain is available to anyone who downloads the blockchain and a wallet. The permissioned ledger 150 may be restricted to those with legitimate carbon credits, carbon debts, and intermediaries providing liquidity to the market. Furthermore, the permissioned ledger 150 may interact with the proof-of-location tag. In other aspects, this proof-of-location technique may also be applied to public ledgers.

The permissioned ledger 150 (e.g. private and owned by in the case of the Carbon-Block by the associated regulator), may be set to only accept blocks and chains within a set location based on the proof-of-location. Therefore, the distributed ledger 150 may reject nonces that do not match a pre-determined location criteria. In the case of the carbon-block, the regulator may determine that carbon credits and debts that occur within the regulator's borders may participate on the distributed ledger 150. For example, a credit generated in the province of Saskatchewan may only be written to the distributed ledger 150 for Saskatchewan. The distributed ledger 150 for Saskatchewan may reject any block originating outside a geo-fence established by the regulator. In the same way, the distributed ledger 150 associated with a port of Vancouver may reject an attempt to write from a port of Los Angeles. This proof-of-location may further server as a layer of security against unauthorized manipulation of the distributed ledger 150.

The server processor 312 and the meter processor 212 may execute a consensus algorithm that has a pluggable framework. As the carbon pricing markets evolve, the blockchain may be updated accordingly. For example, in the event that several state level markets may be consolidated into a regional or national market, the pluggable architecture to the blockchain may permit the regulator to effect the change. For example, if separate marks such as British Columbia, Alberta, and California decided to merge respective carbon credit trading markets operating one or more aspects described herein, a hard form may be initiated to consolidate each of the markets. The hard fork may be initiated by the respective regulators or owners on the distributed ledgers 150 of the markets resulting in classic or old blocks for each of the previous markets and new blocks for the merged market. The hard fork would be written into the blockchain causing the meters 210 to switch to the new distributed ledger 150.

The server processor 312 and/or the meter processor 212 may also execute instructions to effect one or more smart contracts to be added to the blockchain. The smart contract may comprise a computerized transaction protocol that executes one or more terms of the contract. One smart contract that may be embedded into the carbon block may comprise automatic reporting of outstanding carbon debts to the regulator. The automatic reporting may serve as an auditing tool for the regulator to ensure compliance with carbon trading protocols. The smart contract may serve to automatically generate a penalty to an income tax account corresponding to the emitters having a CO2e emission without a corresponding CO2e credit (e.g. a carbon debt).

The smart contracts, combined with the pluggable algorithm, may permit the carbon block to transit across borders. For example, a physical shipment of goods carried from a manufacturer in a low carbon price market may be subject to import duties when entering a high carbon price market. For example, the meter 210 may identify a country of origin on goods being shipped. The origin identifier may also include an associated carbon debt associated with the manufacture and/or transport of the goods. When a shipping manifest is generated, the manifest may be written to the distributed ledger 150. The destination country may read this distributed ledger 150 and identify the manifest. Based on the carbon debt, a tariff may be imposed on the goods. This flexibility may permit the carbon block to be integrated with compatible blocks developed by other blockchain firms, such as attaching the carbon block to a shipping blockchain, and/or attaching the carbon block automatically to a financial transaction.

The smart contract may address a concern by regulators that a cap-and-trade system may result in money flowing from individuals and businesses from cap-and-trade countries to countries without a cap-and-trade system. For example, two factories may competing with each other for business where one factory operates in a high carbon price country and the other factory operates in a low carbon price country. When these factories compete with each other for export business, the factory with the extra cost of carbon added to their goods will be less competitive. By applying import carbon tariffs to goods tracked using the meter 210, a suitable tariff may be applied and the factory in the high carbon price country remains competitive.

According to another aspect, one smart contract may define blocks and anti-blocks within the ledger. The smart contract may define instructions such that when executed by the server processor 312 and/or the meter processor 212, the anti-block and the block cancel each other out and result in both the block and the anti-block to be securely deleted from the ledger 150. By permitting the block and anti-block to be deleted from ledger 150, the amount of resources to process and store the ledger 150 may be reduced. The cancelling of the block and anti-block may be irreversible and acts like a type of imprinting where the existence of each of the blocks may be imprinted on the other block, which may prevent multiple uses of the block and anti-block. In this aspect, the block may be a carbon credit block and the anti-block may be a carbon debt block. In other aspects, this may be reversed such that the block may be a carbon debt block and the anti-block may be a carbon credit block.

At the expiration of the smart contract, the smart contract may automatically complete any outstanding transactions and report to the regulator. For example, if the carbon debtor has accumulated sufficient carbon credits where the blocks and anti-blocks cancel each other out, the blocks and anti-blocks delete each other and report a deletion transaction to the regulator. For a carbon debtor who is unable or unwilling to accumulate sufficient credits, a remaining carbon debt may be reported to the regulator that may apply a financial penalty and/or may assume control of an outstanding carbon debt. In this aspect, the financial penalty may be greater than or equal to a market rate of the carbon debt at the expiration of the smart contract. In another aspect, the penalty may be three times an average market price for the last 12-months. The regulator may then automatically assume control of the outstanding carbon debt indicating that the financial penalty has been sufficient to meet the debtor's obligation. In other aspects, the outstanding carbon debt may remain in the wallet until the debtor meets their obligation to acquire enough credit to pay the debt.

The blocks and chains interact with each other to achieve mutually assured destruction (MAD). This aspect may permit a settling of accounts, and the removal of one or more blocks from existence. A current blockchain models requires an accounting of every block ever created and every transaction that ever occurs. Even dead blockchains that are locked in a digital wallet that has long been lost may be required to be part of the public ledger. The inability to delete blocks from the public ledger has proven to be a major obstacle to the widespread adoption of blockchain technology requiring significant processing and storage requirements.

The smart contract may comprise a self-assured destruction (SAD) instruction. The smart contract within the block may delete the block from the ledger with a predetermined trigger. For example, the smart contract may include a SAD instruction permitting regulators to set an expiration time on carbon credits, such as within 12-months of creation or at an end of a quarter. Other deletion triggers may include if the block is transferred to an unauthorized market participant, if the chain indicates the block has past X transactions, if an audit of the producer of the block has become insolvent or has committed fraud, or in an event an owner of a carbon-credit deposits the block to a regulator's digital wallet for payment.

Both SAD and MAD may require the record of the blockchain to remain on the ledger 150 for a specified amount of time, e.g. 7 days, to ensure the entire ledger 150 may be updated, and to afford time for any discrepancies to be resolved. MAD and SAD may be used for any other transaction that may require closure and deletion from the ledger 150.

In the aspects described herein, the ledger 150 may be implemented using at least a portion of a Hyperledger Fabric, hosted by the Linux Foundation, the contents and open source code of which are herein explicitly incorporated by reference. Although this specific ledger 150 is described herein, other implementations may be used as is understood to one of skill in the art.

The block generation may apply to carbon credit production. For example, carbon credit producers 400 may be added to the blockchain when the meter 210 is initialized as described above. Liquidity may be provided to the market by providing digital wallets to trading computers by the trading platform.

In some aspects, the meter 210 may have difficulty in determining the carbon credit or deficit for a particular emitter 200 or producer 400. In such situation, the regulator may add credits or deficits to the blockchain or distributed ledger 150 based on traditional audit methods.

According to some aspects, the regulator may comprise a master oracle capable of implementing the hard fork, performing adjustments to carbon credits and/or deficits, audit and adjust carbon credits/and or deficits in response to traditional carbon credit auditing, etc.

According to another aspect, the GPS coordinates and proof-of-location within the blockchain may also be used in aspects of real estate transactions and tracking ownership of goods moving through the economy. The Proof-of-location may be added to the nonce as described herein, and form part of the block.

Although the aspects herein describe sensors 214 for measuring the fuel consumed, other aspects may have the meter 210 comprise at least one data port, such as a USB port for receiving fuel consumption data and/or carbon reduction data. The received data may be incorporated into the block.

The meter or oracle 210 may additionally comprise temperature sensors, humidity sensors, atmospheric pressure sensors, altitude sensors, velocity sensors, acceleration sensors, tilt sensors, electrical current sensors, fluid flow sensors, and/or atmospheric contaminant sensors. Using these sensors, the meter or oracle 210 and associated blockchain protocol may apply to other fields as understood by one of skill in the art on reading the aspects as described herein.

According to the aspect described herein, the transceiver 222 may be one or more of RFID, NFC, a cellular sim-card, Bluetooth, and/or a Wi-fi transmitter.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A tracking system comprising:
    at least one meter for producing measurement data; and
    a network for communicating with the at least one meter, the network being implemented as a distributed ledger of a blockchain;
    wherein the at least one meter transforms the measurement data into at least one block and writes the at least one block to the distributed ledger;
    wherein the at least one block is distributed to other meters via a protocol; and
    wherein the distributed ledger comprises a permissioned ledger allowing access to limited data of the blockchain without having to participate in the entire blockchain; and the permissioned ledger is configured to accept or reject the at least one block within a pre-determined location.

2. The tracking system of claim 1, wherein each of the at least one meter comprises:
    at least one sensor for generating the measurement data;
    a memory for storing the measurement data from the at least one sensor;
    a meter processor in communication with the at least one sensor for transforming the measurement data into the at least one block; and
    a meter transceiver for transmitting the at least one block to the distributed ledger.

3. The tracking system of claim 2, further comprising a global positioning sensor (GPS) for measuring a location and a clock set to a time zone determined by the GPS.

4. The tracking system of claim 3, wherein the meter processor bundles the measurement data from the at least one sensor, the location, and the clock into at least one data packet, and transforms the at least one data packet into the at least one block.

5. The tracking system of claim 4, wherein the at least one meter is configured for encrypting and decrypting a plurality of instructions for execution by the meter processor.

6. The tracking system of claim 1, wherein the at least one meter is in communication with a tamper detection device comprising:
a data port for communicating with at least one peripheral device outside of the protocol;
a tamper detection processor in communication with the at least one meter; and
a tamper detection transceiver for communicating with the network;
wherein when the tamper detection device detects an incident of tampering with the measurement data, the tamper detection processor transforms tampering data, and the tamper detection transceiver transmits the tampering data to the distributed ledger.

7. The tracking system of claim 6, wherein the at least one peripheral device comprises an RFID tag recognized by the at least one meter, the meter having a meter processor in communication with the at least one sensor;
wherein the meter processor generates a message based on a signal from the RFID tag to be incorporated into the blockchain according to the protocol.

8. The tracking system of claim 1, further comprising at least one server having:
a server processor;
a tangible computer-readable medium, and
a server transceiver for communicating with the network.

9. The tracking system of claim 8, wherein the at least one server is configured for encrypting and decrypting a plurality of instructions for execution by the server processor.

10. The tracking system of claim 9, wherein the tangible computer-readable medium comprises the plurality of instructions to configure the server processor to receive at least a portion of the blockchain.

11. The tracking system of claim 9, wherein the server processor is configured to only receive communication from the at least one meter that has been registered in the blockchain.

12. The tracking system of claim 1, further comprising a smart contract added to the blockchain to be executed by a processor, the smart contract having instructions to execute one or more terms of the smart contract.

13. The tracking system of claim 12, wherein the instructions of the smart contract include comprises instructions to perform at one of the following: deleting defined blocks from the distributed ledger based on predetermined criteria, and modifying defined blocks from the distributed ledger based on predetermined criteria.

14. The tracking system of claim 13, wherein the defined blocks comprise blocks representing carbon debt and anti-blocks representing carbon credit, wherein the carbon debt and the carbon credit cancel each other out to allow deletion of the defined blocks.

15. The tracking system of claim 12, wherein the instructions of the smart contract permit the at least one block to transit across at least one border of the pre-determined location.

16. A tracking method, comprising:
using a sensor to obtain at least one measurement,
using the sensor to transform the at least one measurement into at least one block;
rising the sensor to write the at least one block into a distributed ledger of a blockchain, wherein the distributed ledger is implemented by a network in communication with the sensor, and wherein the distributed ledger comprises a permissioned ledger allowing access to limited data of the blockchain without having to participate in the entire blockchain, and the permissioned ledger accepts or rejects the at least one block within a pre-determined location; and
using the distributed ledger to distribute the at least one block to at least one peer via a protocol.

17. The tracking method of claim 16, wherein the obtaining at least one measurement obtained by the sensor involves:
measuring a fuel amount;
measuring a location of at least one emitter; and
measuring a time related to the location.

18. The tracking method of claim 17, further comprising using the sensor to bundle the measurement of the fuel amount, the location, and the time into a measurement data packet before transforming the measurement data packet into the at least one block.

19. The tracking method of claim 18, further comprising using the sensor to generate a starting block including initial data before the at least one measurement is obtained by the sensor.

20. A tracking system comprising:
at least one meter for producing measurement data;
a network for communicating with the at least one meter, the network being implemented as a distributed ledger of a blockchain; and
a tamper detection device having:
a tamper detection processor in communication with the at least one meter; and
a tamper detection transceiver for communicating with the network;
wherein the at least one meter transforms the measurement data into at least one block and writes the at least one block to the distributed ledger, and the at least one block is distributed to other meters via a protocol;
wherein when the tamper detection device detects an incident of tampering, the tamper detection processor transforms tampering data, and the tamper detection transceiver transmits the tampering data to the distributed ledger.

21. The tracking system of claim 20, wherein upon detection of the incident of tampering, the processor de-authorizes the at least one meter from writing to the distributed ledger.

* * * * *